US008509997B2

(12) United States Patent
Sorimachi

(10) Patent No.: US 8,509,997 B2
(45) Date of Patent: Aug. 13, 2013

(54) PASSENGER DETECTION SYSTEM

(75) Inventor: Mutsumi Sorimachi, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 24 days.

(21) Appl. No.: 13/280,965

(22) Filed: Oct. 25, 2011

(65) Prior Publication Data

US 2012/0143444 A1    Jun. 7, 2012

(30) Foreign Application Priority Data

Dec. 6, 2010 (JP) .................. 2010-271848

(51) Int. Cl.
*B60R 22/00* (2006.01)
*B60R 21/16* (2006.01)
*B60R 21/00* (2006.01)
*B60D 1/28* (2006.01)

(52) U.S. Cl.
USPC .............. 701/45; 280/734; 180/268; 180/271

(58) Field of Classification Search
USPC ........................................... 701/45; 702/155
See application file for complete search history.

(56) References Cited

U.S. PATENT DOCUMENTS

| | | | | |
|---|---|---|---|---|
| 7,032,700 B2* | 4/2006 | Sakai et al. | ................... | 180/273 |
| 7,055,639 B2* | 6/2006 | Kiribayashi | .................. | 180/271 |
| 7,266,471 B2* | 9/2007 | Jitsui et al. | ..................... | 702/155 |
| 7,786,882 B2* | 8/2010 | Okawa | .......................... | 340/667 |
| 2002/0154020 A1* | 10/2002 | Sumi et al. | ..................... | 340/667 |
| 2003/0209893 A1* | 11/2003 | Breed et al. | .................... | 280/735 |
| 2004/0024508 A1* | 2/2004 | Sakai et al. | ...................... | 701/45 |
| 2004/0232674 A1* | 11/2004 | Winkler et al. | ............... | 280/735 |
| 2005/0209755 A1* | 9/2005 | Sugiura | ............................ | 701/45 |
| 2005/0242554 A1* | 11/2005 | Fujii | ............................. | 280/735 |
| 2006/0226641 A1* | 10/2006 | Watts | ....................... | 280/735 |
| 2009/0008915 A1* | 1/2009 | Baumann et al. | ............ | 280/734 |
| 2009/0027188 A1* | 1/2009 | Saban | .......................... | 340/521 |

FOREIGN PATENT DOCUMENTS

JP    4339368 B2    10/2009

* cited by examiner

*Primary Examiner* — Thomas Black
*Assistant Examiner* — Tyler Paige
(74) *Attorney, Agent, or Firm* — Global IP Counselors, LLP

(57) ABSTRACT

A passenger detection system includes a passenger detecting part including a load detecting section that detects a load caused by a passenger seated on a seat of a vehicle, and a passenger detection controller including a passenger recognizing section, a movement detecting section and an activation determining section. The passenger recognizing section executes a passenger recognition based on a load detection signal outputted from the load detecting section. The movement detecting section detects whether the vehicle is moving based on the load detection signal. The activation determining section determines whether or not to activate an airbag apparatus based on a passenger recognition signal when a movement detection signal outputted from the movement detecting section indicates that the vehicle is stopped, and forgoes executing the determination and holds a determination result from a previous control cycle when the movement detection signal indicates that the vehicle is moving.

4 Claims, 6 Drawing Sheets

PASSENGER DETECTION SYSTEM

CROSS-REFERENCE TO RELATED APPLICATIONS

This application claims priority to Japanese Patent Application No. 2010-271848, filed on Dec. 6, 2010. The entire disclosure of Japanese Patent Application No. 2010-271848 is hereby incorporated herein by reference.

BACKGROUND

1. Field of the Invention

The present invention relates to a passenger detection system. More particularly, the present invention relates to a passenger detection system used to determine whether or not to activate an airbag apparatus provided in a car or other vehicle.

2. Background Information

A car or other vehicle is provided with a seat for a passenger to sit on, and an airbag apparatus configured and arranged to protect a seated passenger is provided with respect to the seat. Such an airbag apparatus is controlled by an airbag controller.

Regarding an airbag system like that just mentioned, the idea of providing a passenger detection system to determine if the airbag apparatus should be activated based on the passenger has already been considered in, for example, Japanese Patent Number 4339368.

This passenger detection system has a load sensor installed peripherally to the seat and a passenger detection controller configured to determine whether or not the airbag apparatus should be activated by determining if a passenger is sitting in the seat based on a load detection signal from the load sensor. The determination result obtained by the passenger detection controller is conveyed to the aforementioned airbag controller and used in a control executed by the airbag controller.

With such a passenger detection system, the passenger detection controller determines that a passenger is seated and the airbag apparatus should be activated when the load detection signal from the load sensor is larger than a preset internal threshold value and determines that a passenger is not seated and the airbag apparatus should not be activated when the load detection signal is smaller than the threshold value.

In this way, the airbag controller executes a control such that the airbag apparatus is activated when a passenger is sitting in the seat and not activated when a passenger is not sitting on the seat.

SUMMARY

The passenger detection system presented in the above mentioned publication incurs problems that will now be explained.

Since the system is configured to determine whether or not to activate the airbag apparatus by comparing a load detection signal from the load sensor to a preset threshold value to determine if a passenger is seated, there is a possibility that the system will mistakenly detect that a passenger is seated due to the load detection signal from the load sensor undergoing a severe fluctuation and exceeding the threshold value while the vehicle is moving.

Also, although a passenger can be expected (with a substantially high degree of certainty) to sit and not move from the seat while the vehicle is moving, the conventional system is configured to constantly determine whether or not to activate the airbag apparatus (by detecting if a passenger is seated) without distinguishing between whether the vehicle is moving or stopped. Thus, there is room for improvement in the prior art.

In order to execute the determination in a manner that distinguishes between whether the vehicle is moving or stopped, it is feasible to acquire a movement detection signal from an external source. However, acquiring a movement signal from an external source is disadvantageous because it entails such difficulties as providing an interface with respect to the external source and establishing compatibility with respect to the movement detection signal from the external source. Therefore, in order to avoid such difficulties, it is necessary to contrive the passenger detection controller such that it can determine internally whether the vehicle is moving or stopped.

Additionally, the aforementioned load sensor is expensive and the system presented in the cited Japanese Patent Number 4339368 is costly because it has these expensive load sensors amounted at all support points where the seat is supported with respect to the vehicle body.

In order to address the aforementioned problems, a passenger detection system according to one aspect of the present invention includes a passenger detecting part including a load detecting section configured and arranged to detect a load caused by a passenger seated on a seat of a vehicle, and a passenger detection controller including a passenger recognizing section, a movement detecting section and an activation determining section. The passenger recognizing section is configured to execute a passenger recognition based on a load detection signal outputted from the load detecting section. The movement detecting section is configured to detect whether or not the vehicle is moving based on the load detection signal outputted from the load detecting section. The activation determining section is configured to execute a determination as to whether or not to activate an airbag apparatus of the vehicle based on a passenger recognition signal outputted from the passenger recognizing section and to issue an activation determination signal when a movement detection signal outputted from the movement detecting section indicates that the vehicle is stopped, and to forgo executing a determination as to whether or not to activate the airbag apparatus and to hold a determination result from a previous control cycle when the movement detection signal indicates that the vehicle is moving.

With this aspect, an accurate determination as to whether the vehicle is moving or stopped can be accomplished inside the passenger detection controller and execution of a determination as to whether or not to activate the airbag apparatus based on the passenger recognition signal can be avoided when the vehicle is moving. Thus, the activation determining section can obtain a correct activation determination even under conditions where the passenger recognizing section might deliver an incorrect passenger recognition result due to a load detection signal that has been affected by vehicle movement.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The passenger detection system accordance with the embodiment is configured to obtain a correct activation determination result by eliminating the effect of vehicle movement and to reduce cost.

Figure 1:
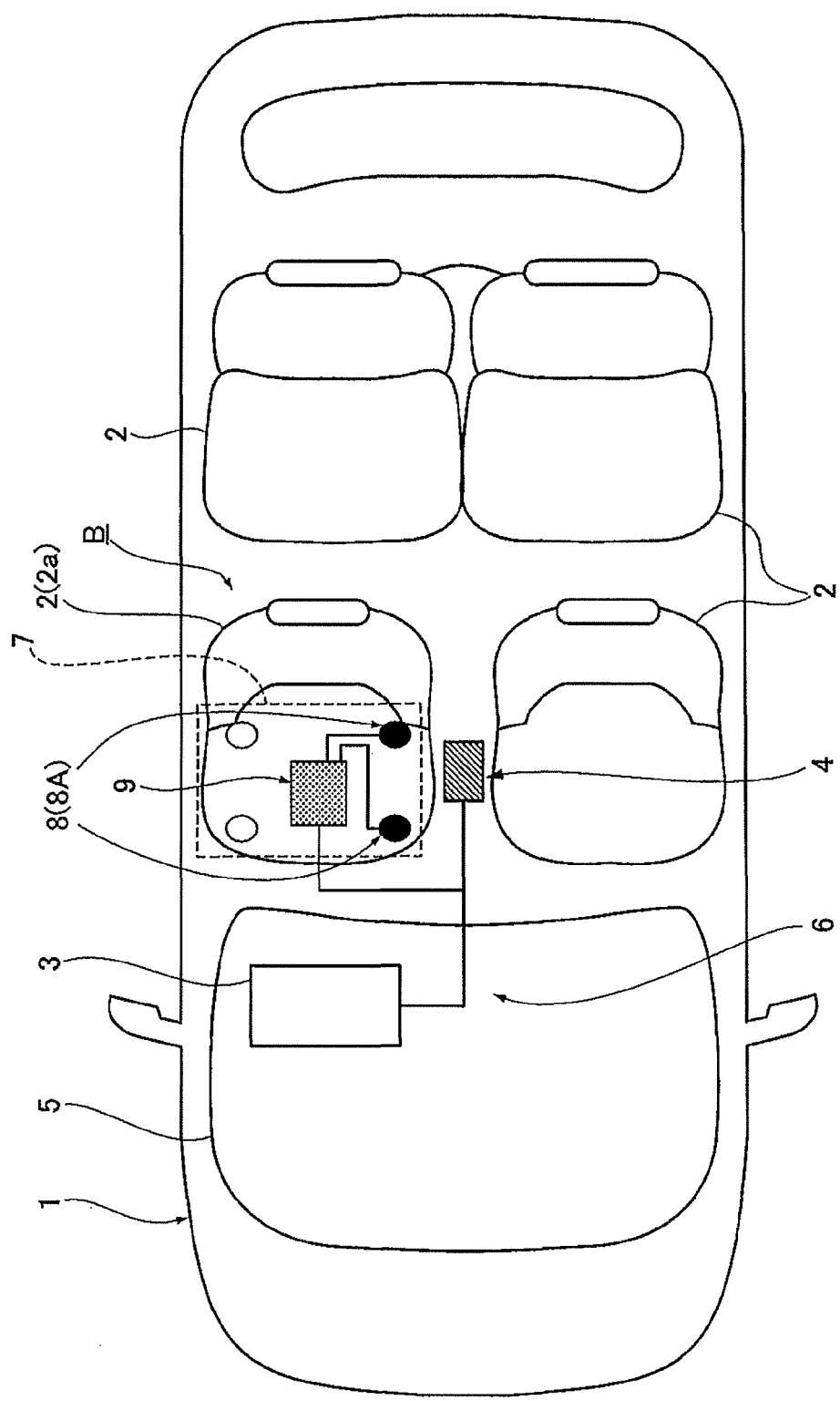
FIG. 1 is a schematic top plan view of a car or other vehicle equipped with an embodiment of the present invention.

FIG. 1 is a schematic top plan view of car or other vehicle 1. The vehicle 1 is provided with a seat 2 for a passenger to sit on and an airbag apparatus 3 configured and arranged to protect a seated passenger is provided with respires to the seat 2. The airbag apparatus 3 is controlled by an airbag controller 4.

The airbag apparatus 3 is provided in a portion of an instrument panel 5 located on a passenger seat 2a side of the vehicle. However, it is acceptable for an airbag system 6 like that explained previously to be provided with respect to a seat 2 other than the passenger seat 2a. In the vehicle 1 shown in the figure, the driver's seat is on the left side and the passenger seat 2a is on the right side.

A passenger detection system 7 configured to determine whether the airbag apparatus 3 should be activated is provided with respect to the airbag system 6.

The passenger detection system 7 has at least one passenger detecting parts 8 mounted peripherally to a seat 2 (more specifically, the passenger seat 2a in this embodiment) and a passenger detection controller 9 configured to determine whether or not to activate the airbag apparatus 3 based on a passenger detection signal (e.g., a load detection signal in this embodiment) from the passenger detecting part 8. In this embodiment, two passenger detecting parts 8 are provided as shown in FIG. 1. Each of the passenger detecting part 8 is, for example, a load detecting section 8A configured and arranged to detect a load caused by a passenger seated in the seat 2.

Figure 2:
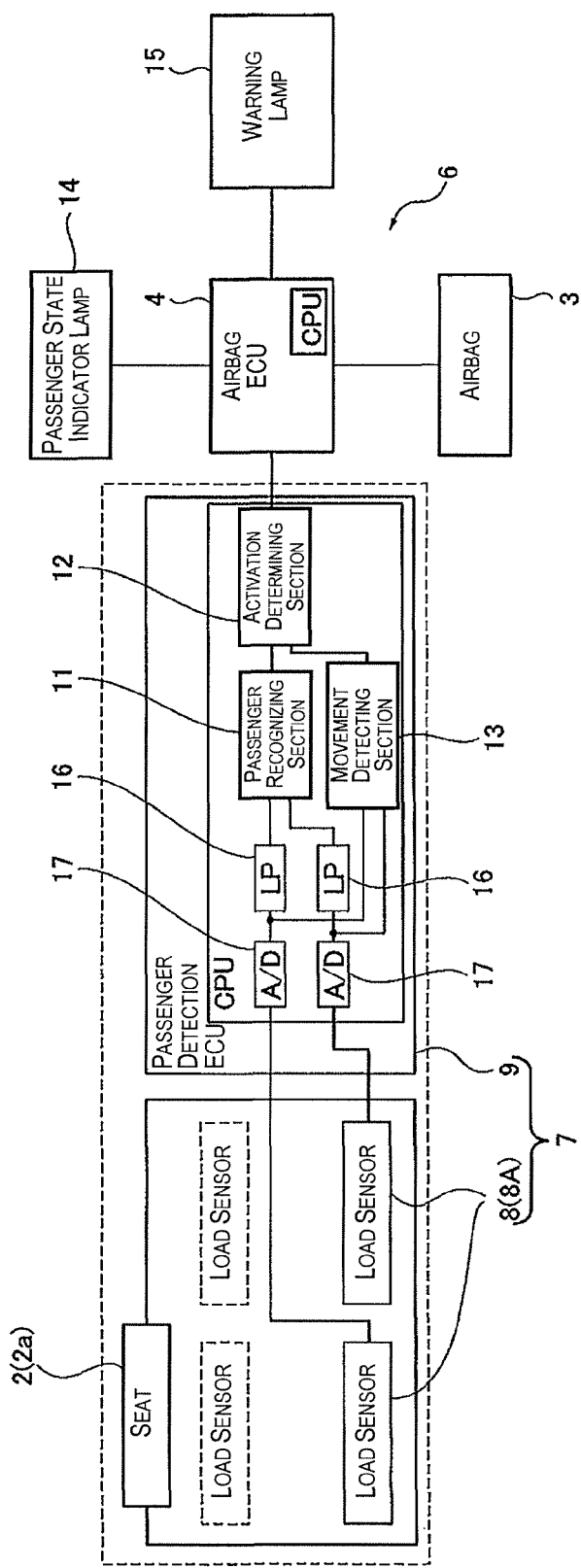
FIG. 2 is a block diagram of an airbag controller and a passenger detection system shown in FIG. 1.

FIG. 2 is a block diagram of the passenger detection system 7 and the airbag controller 4. The passenger detection system 7 will now be explained.

The passenger detection controller 9 has a passenger recognizing section 11 and an activation determining section 12 as internal main parts. The passenger recognizing section 11 is configured to execute a passenger recognition operation using a passenger recognition logic based on a load detection signal from the load detecting section 8A (indicated as "load sensor" in the drawings), and the activation determining section 12 is configured to determine whether or not to activate the airbag apparatus 3 using an activation determination logic based on a passenger recognition signal from the passenger recognizing section 11 and generate an activation determination signal.

The passenger detection controller 9 also has an internal movement detecting section 13 configured to detect if the vehicle is moving using a movement detection logic based on a load detection signal from the load detecting section 8A. By providing the movement detecting section 13, the activation determining section 12 is configured to execute a determination as to whether or not to activate the airbag apparatus 3 based on a passenger recognition signal when a movement detection signal from the movement detecting section 13 indicates that the vehicle is stopped, and to hold a determination result of a previous control cycle without executing a determination as to whether or not to activate the airbag apparatus 3 based on the passenger recognition signal when the movement detection signal indicates that the vehicle is moving.

The airbag controller 4 (indicated as "airbag ECU" in the drawings) can be, for example, a one-chip microcomputer having an internal central processing unit (CPU).

The airbag controller 4 is connected to a passenger indicator lamp 14 configured to graphically indicate a passenger state, e.g., such states as no passenger, an adult, and a child seat, based on an activation determination signal from the passenger detection controller 9 and a warning lamp 15 configured to indicate a failure of the airbag apparatus 3 and issue a warning. The passenger indicator lamp 14 and the warning lamp 15 are installed in a gauge and indicator section of the instrument panel 5.

The passenger detection controller 9 (indicated as "passenger detection ECU" in the drawings) of the passenger detection system 7 can be, for example, a one-chip microcomputer having an internal central processing unit (CPU). The aforementioned passenger recognizing section 11, activation determining section 12, and movement detecting section 13 are realized with processing executed by the internal central processing unit (CPU).

The aforementioned passenger recognition operation includes at least a seated state recognition that recognizes if a passenger is sitting in the seat 2 and a body type recognition that recognizes if a passenger sitting in the seat 2 has a large body (e.g., if the passenger is an adult or a child). In this embodiment, "passenger recognition" is used to mean at least one of these. The seated state recognition and the body type recognition can be accomplished by using different threshold values, respectively.

The passenger detection controller 9 is provided with a movement waveform removing section 16 configured to remove a movement waveform (e.g., a component of the waveform resulting from movement of the vehicle), which indicates that the vehicle is moving, from a load detection signal of the load detecting section 8A. The passenger recognizing section 11 is configured to generate the passenger recognition signal based on a movement-waveform-removed signal resulting after the movement waveform has been removed from the load detection signal of the load detecting section 8A by the movement waveform removing section 16. Meanwhile, the movement detecting section 13 is configured to generate a movement detection signal based on the load detection signal before the movement waveform is removed by the movement waveform removing section 16, i.e., the load detection signal from the load detecting section 8A that includes the movement waveform.

In other words, the passenger recognizing section 11 is connected in series downstream of the movement waveform removing section 16 and the movement detecting section 13 is connected in parallel with the movement waveform removing section 16 and the passenger recognizing section 11.

The movement waveform is, for example, a high frequency vibration component (riding vibration) oriented in a vertical direction. The movement waveform removing section 16 can be, for example, a low-pass filter (indicated as "LP" in the drawings) that can remove high-frequency vibration components acting as movement waveforms. The passenger detection controller 9 also has a signal converting section 17 that is connected upstream of the movement waveform removing section 16 and the movement detecting section 13 and comprises an A/D converter (indicated as "A/D" in the drawings) configured to execute an analog-to-digital conversion with respect to a load detection signal from the load detecting section 8A.

Independent systems comprising a signal converting section 17 and a movement waveform removing section 16 are provided with respect to each of the load detecting sections 8A. These systems merge at the passenger recognizing section 11 and the movement detecting section 13.

Figure 3:
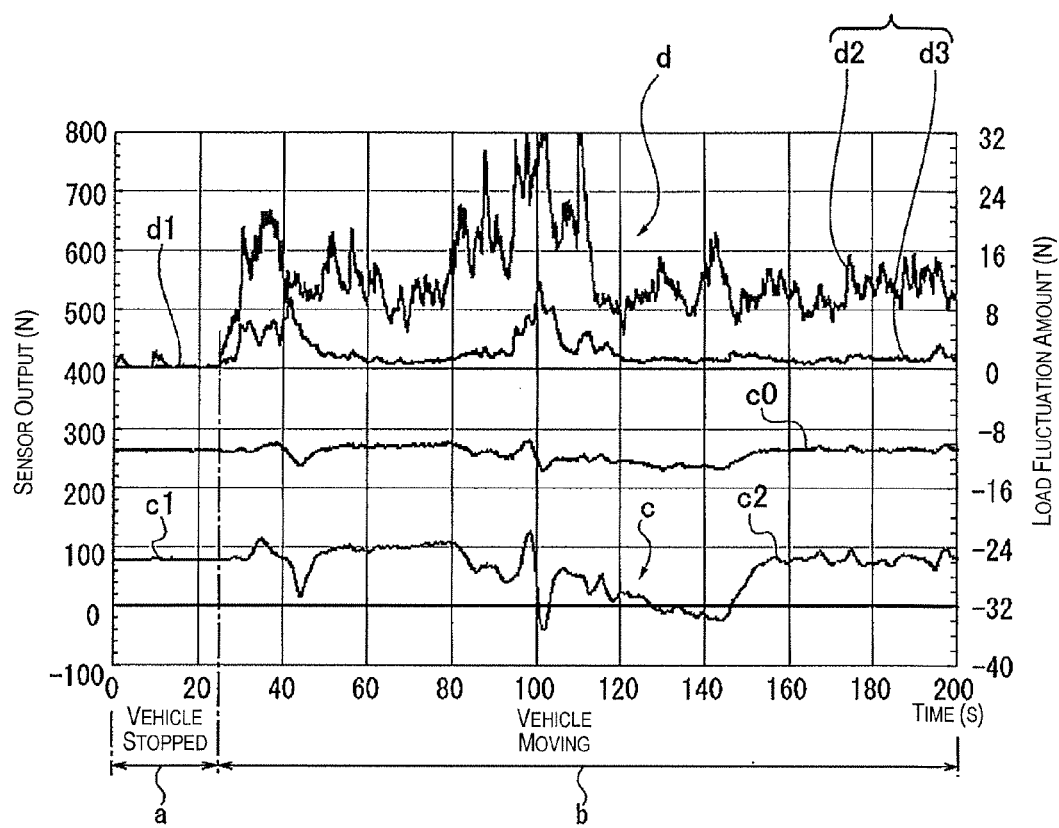
FIG. 3 is a graph showing a load detection signal from a load detecting section shown in FIG. 1 or 2.

FIG. 3 is a graph showing a load detection signal from the load detecting section 8A. In the figure, during the period (a) the vehicle is stopped and during the period (b) the vehicle is moving. The curve c is a load detection signal (weight information) obtained with this embodiment (as will be explained later, this signal is a total sum for a case in which the number of load detecting sections 8A has been reduced) and the curve c0 is a load detection signal (weight information) obtained with a comparative example (this signal is a total sum for a case in which the number of load detecting sections 8A has not been reduced and four load detecting sections 8A are installed, i.e., one at each of four support points 24a to 24d (explained later)). The curve d indicates a load fluctuation amount occurring in the case of the comparative example.

As explained previously, the movement waveform comprises chiefly movement vibrations (high-frequency vibration components) oriented in a vertical direction. For example, the load fluctuation amount (curve d) in the comparative example exhibits a waveform d1 when the vehicle is stopped, a waveform d2 that includes a movement waveform when the vehicle is moving, and a waveform d3 when the movement waveform is removed to obtain a movement-waveform-removed signal (represented by the waveform d3). The comparatively large difference between the waveform d1 exhibited when the vehicle is stopped and the waveform d2 including a movement waveform exhibited when the vehicle is moving is convenient for detecting if the vehicle is moving. Conversely, the comparatively small difference between the waveform d1 exhibited when the vehicle is stopped and the waveform d3 obtained by removing the movement waveform to obtain a movement-waveform-removed signal is not convenient for detecting a passenger.

Meanwhile, the load detection signal (curve c) used in the embodiment exhibits a waveform c1 when the vehicle is stopped and a waveform c2 when the vehicle is moving. These waveforms are smaller and less advantageous than a curve c0 obtained in a conventional manner due to the number of load detecting sections 8A having been reduced.

Figure 4A:
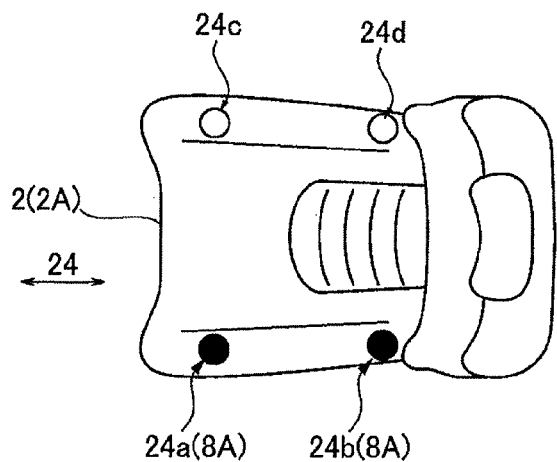
FIG. 4A is a top plan view.
Figure 4B:
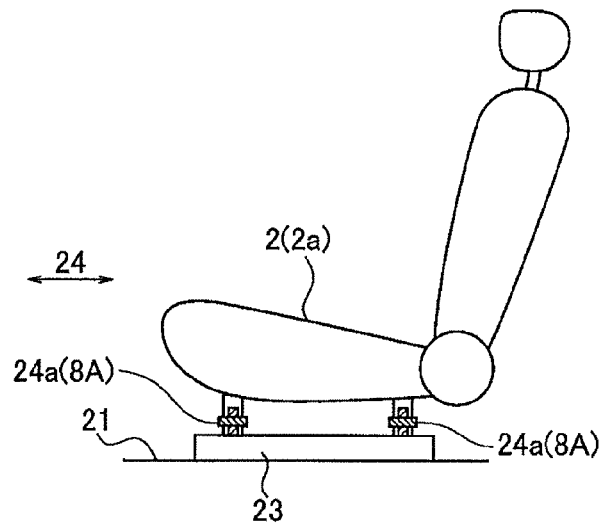
FIG. 4B is a side view and FIG. 4C is a frontal view of a mounting arrangement of load detecting section with respect to a seat shown in FIG. 1.
Figure 4C:
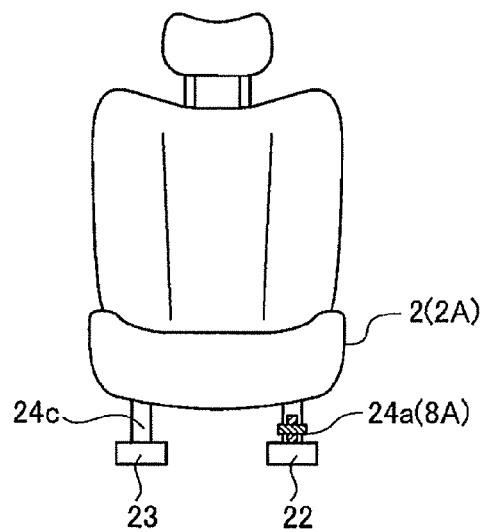

FIGS. 4A to 4C show a mounting arrangement of load detecting sections 8A with respect to the aforementioned seat 2. FIG. 4A is a top plan view, FIG. 4B is a side view, and FIG. 4C is a frontal view.

The seat 2 is mounted to a vehicle body 21 through a left-right pair of slide rails 22 and 23 such that it can slide (its position can be adjusted) along the slide rails 22 and 23 in a longitudinal direction 24 of the vehicle. The seat 2 is supported at a total of four locations with respect to the pair of slide rails 22 and 23, i.e., at front and rear support points 24a to 24d on each of the left and right sides.

If the seat 2 is supported on the vehicle body 21 at a plurality of support points 24a to 24d, then the load detecting sections 8A are installed with respect to at least one of the support points 24a to 24d and not installed with respect to at least one of the support points 24a to 24d.

In other words, at least one of the support points 24a to 24d does not have a load detecting section 8A installed, thus establishing a load detecting section omitted section.

For example, it is acceptable to provide only two load detecting sections 8A, one with respect to each of the front and rear support points 24a and 24b of the slide rail 22, which is located more inwardly with respect to the vehicle body 21.

Figure 5:
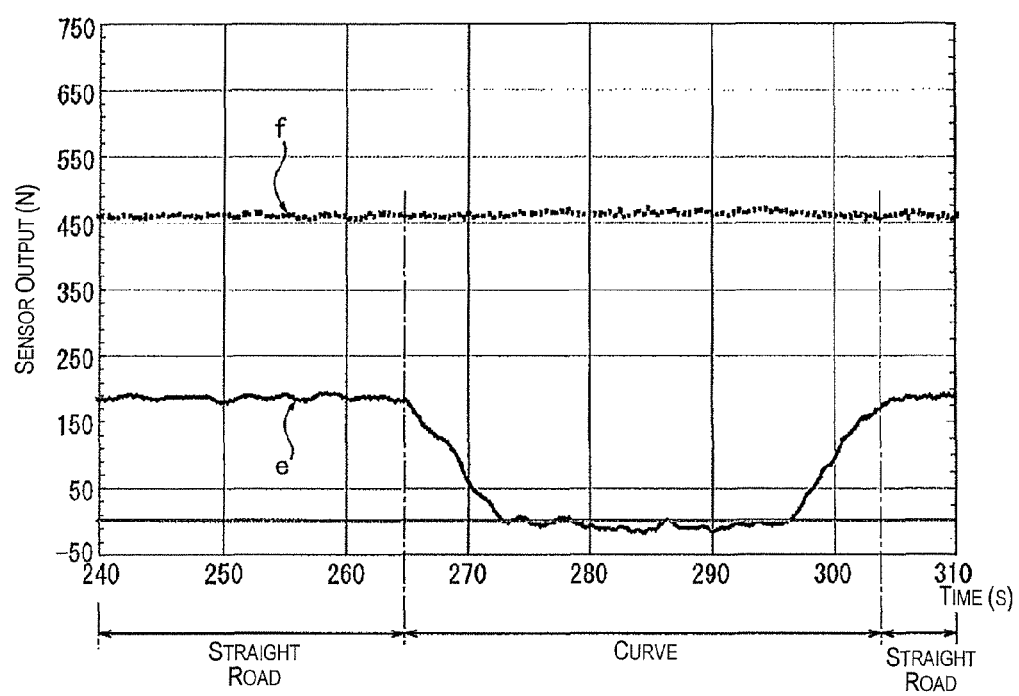
FIG. 5 is a graph showing how a load detection signal differs when the number of load detecting section installed is different.

FIG. 5 is a graph showing how a load detection signal differs when the number of load detecting sections 8A installed differs. In the figure, the curve E illustrates a case according to the embodiment in which two load detecting sections 8A are provided such that one is located at the frontward support point 24a and one is located at the rearward support point 24b, and the curve F corresponds to a comparative example in which a load detecting section 8A is provided at each of all four support points 24a to 24d.

The magnitude of the load detection signal, i.e., the curve E, obtained when two load detecting devices 8A are provided on one side is approximately one half the magnitude of the curve F obtained when load detecting sections 8A are provided in all locations. Moreover, the magnitude of the load detection signal indicated by the curve E decreases greatly when the vehicle is traveling through a curve as opposed to a straight road. This phenomenon is believed to be caused by centrifugal force acting on the side opposite the side where the load detecting sections 8A are provided and causing the detected load to decrease. Conversely, with the curve F obtained when four load detecting sections 8A are provided, the magnitude of the load detection signal is approximately twice as large as the magnitude of the curve E This stability is believed to occur because a balanced depiction of the load is obtained with all of the load detecting sections 8A even if a centrifugal force exists.

It is also acceptable to provide two load detecting sections 8A arranged at another combination of support points other than the arrangement already explained, i.e., at the front and rear support points 24c and 24d of the slide rail 23 on the outer side of the vehicle body 21, at the front support points 24a and 24c, at the rear support points 24b and 24d, or at the diagonally positioned support points 24a and 24d or 24c and 24b. It is also acceptable to provide load detecting sections 8A in three locations and leave only one of the front and rear support points 24a to 24d without. Furthermore, it is acceptable to provide a load detecting section 8A at only one of the front and rear support points 24a to 24d. However, since, as previously explained, the magnitude and stability of the load detection signal degrade as the number of load detecting sections 8A installed is decreased, it is preferable to install load detecting sections 8A in two or three locations instead of one.

The operation of the embodiment will now be explained.

First, an overview of the operation including the airbag system 6 will be explained. The passenger detecting part 8 installed peripherally to the seat 2 detects a presence of a passenger seated on the seat 2. The passenger detection controller 9 determines whether or not to activate the airbag apparatus 3 based on a passenger detection signal (e.g., a load detection signal in this embodiment) from the passenger detecting part 8. The result of the activation determination is sent to the airbag controller 4 and the airbag controller 4 determines if the airbag apparatus 3 will be operated in an emergency. The load detecting sections 8A configured to detect a load caused by a passenger seated in the seat 2 are used as the passenger detecting parts 8. Thus, a passenger is detected based on a load on the seat caused by the passenger.

The operation of the passenger detection controller 9 will now be explained. The passenger recognizing section 11 inside the passenger detection controller 9 executes a passenger recognition operation based on a load detection signal from the load detecting section 8A. Aspects of recognizing a passenger include recognizing if a passenger is seated and recognizing a body type of a passenger and the passenger recognition operation includes at least one of these. The activation determining section 12 determines whether or not to activate the airbag apparatus 3 based on the passenger recognition signal from the passenger recognizing section 11 and issues an activation determination signal.

Additionally, the movement detecting section 13 of the passenger detection controller 9 detects if the vehicle is moving or not based on the load detection signal from the load detecting section 8A. Based on a movement detection signal from the movement detecting section 13, the activation determining section 12 executes a determination as to whether or not to activate the airbag apparatus 3 based on the passenger recognition signal and updates the determination result if the vehicle is stopped, and holds the determination result of a previous control cycle without executing a determination as to whether or not to activate the airbag apparatus 3 based on the passenger recognition signal when the movement detection signal indicates that the vehicle is moving. That is, when the vehicle is moving, a passenger recognition result obtained when the vehicle was stopped is held in place without updating because there is little chance that the passenger will move from the seat 2 or change places.

Figure 6:
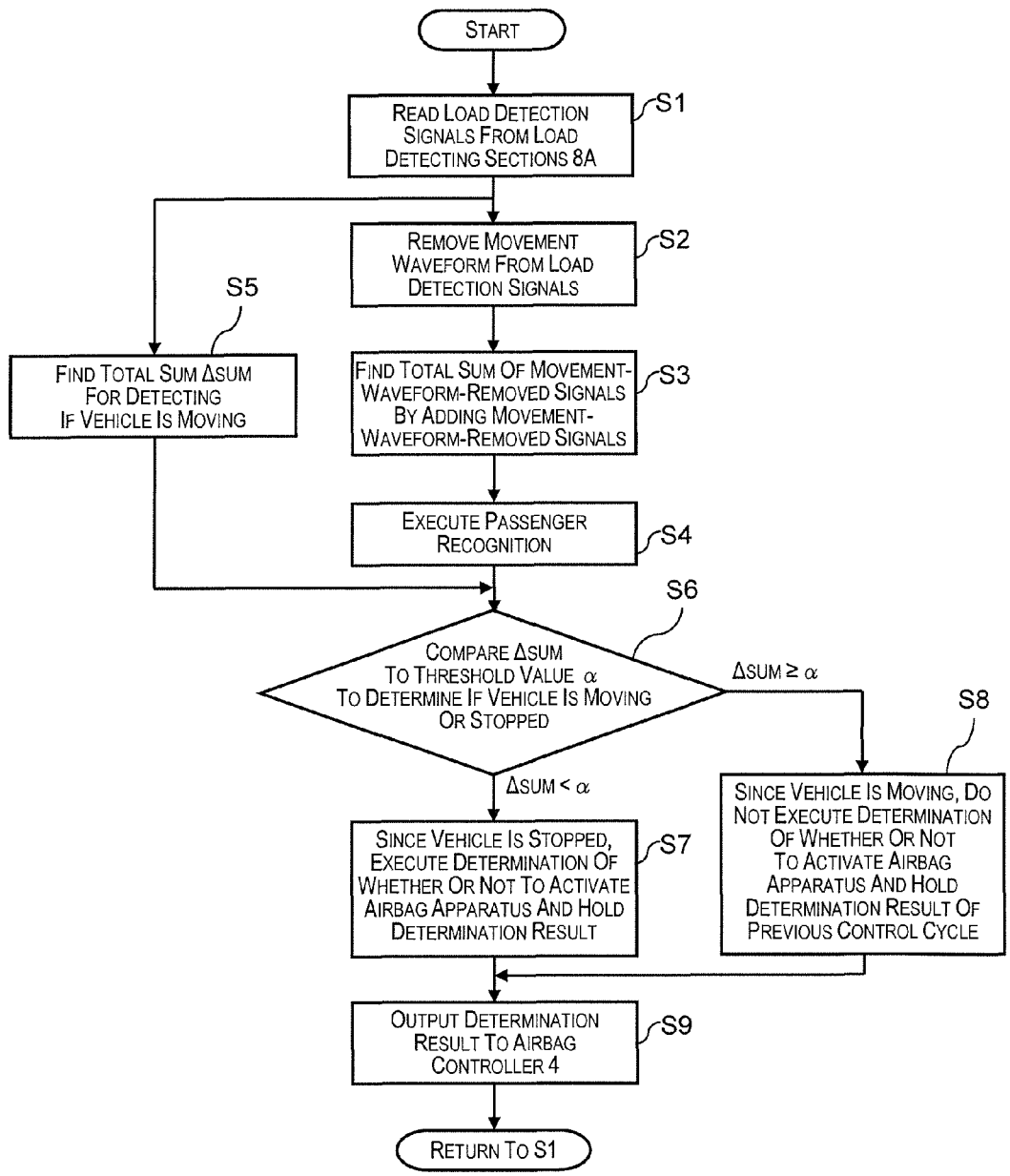
FIG. 6 is a flowchart showing an operation of a passenger detection controller shown in FIG. 2.

FIG. 6 is a flowchart showing one example of an algorithm for the operations of the passenger detection controller 9 in more detail.

Step S1 of the flowchart is a reading step in which the signal converting section 17 reads the load detection signals from the load detecting sections 8A. The signal converting section 17 also converts the load detection signals from the load detecting sections 8A from analog to digital. The reading step is executed by each of the aforementioned independent systems corresponding to each of the load detecting sections 8A.

Step S2 is a movement waveform removing step in which the movement waveform removing section 16 obtains a movement-waveform-removed signal by removing a movement waveform indicating the vehicle is moving from the load detection signals outputted from the load detecting sections 8A. The movement waveform removing step is executed by each of the aforementioned independent systems corresponding to each of the load detecting sections 8A.

Step S3 is an addition operation step in which the passenger recognizing section 11 adds the individual movement-waveform-removed signals together to obtain a total sum of the movement-waveform-removed signals.

Step S4 is a passenger recognizing step in which the passenger recognizing section 11 compares the total sum of the movement-waveform-removed signals to a threshold value to determine if a passenger is sitting on the seat 2 (seated state recognition). The passenger recognizing section 11 determines that a passenger is seated if the total sum is larger than the threshold value or that a passenger is not seated if the total sum is smaller than the threshold value. The threshold value (first threshold value) is a comparatively small value that can be used to ascertain in a generally reliable fashion whether a load caused by a passenger is acting on the seat 2. The threshold value is set by trial and error to a value that delivers an appropriate determination result.

The passenger recognizing section 11 then compares the total sum of the movement-waveform-removed signals to a different threshold value (second threshold value) than that mentioned previously and determines if the passenger sitting on the seat 2 is an adult or a child (body type recognition). The passenger recognizing section 11 determines that the passenger is an adult if the total sum signal is larger than the threshold value and that the passenger is a child if the total sum is smaller than the threshold value. This threshold value is a larger value than the previously mentioned threshold value and is set the passenger detection system can reliably distinguish between an adult and a child.

More specifically, for example, assume the system is to distinguish between a small adult female (estimated weight 45 kg) and a one-year-old child (estimated weight 10 kg) seated on the seat 2 through a child seat (estimated weight 10 kg). In such a case, a value lying between 45 kg and 20 kg (=10 kg+10 kg) is divided by the total number of support points 24a to 24d, i.e., four (which is the maximum number of load detecting sections 8A that can be installed), and then multiplied by the number of load detecting sections 8A actually installed. The resulting value is revised as necessary and used as the threshold value. The revision can be accomplished by appropriately using, for example, a revision value related to the installation positions of the load detecting sections 8A (e.g., a value expressing a dispersion of the loads acting at the support points 24a to 24d that occurs when a seatbelt is fastened) and a revision value related to an offset amount of a passenger's sitting position with respect to the seat 2 (e.g., a value expressing a dispersion of the loads acting at the support points 24a to 24d that occurs when a passenger sits deeply, shallowly, or offset to the left or right). Since the threshold values need to be set more precisely as the number of load detecting sections 8A decreases, the threshold values are set by trial and error to values that deliver an appropriate determination result. Although in this embodiment the passenger recognizing section 11 executes at least one or the other of a seated state recognition and a body type recognition, it is also possible to, for example, contrive the system such that the passenger recognizing section 11 executes a seated state recognition and the activation determining section 12 located downstream executes a body type recognition such that different component parts execute the seated state recognition and the body type recognition separately (in other words, a portion of the passenger recognition operation is allocated to the activation determining section 12).

Step S5 is a movement detecting step executed in parallel with the steps 2 to 4 in which the movement detecting section 13 detects whether or not the vehicle is moving based on the load detection signals from the load detecting sections 8A before the movement waveforms have been removed by the movement waveform removing section 16. More specifically, the movement detecting section 13 takes an absolute value of the fluctuation amount of each of the load detecting signals (amplitude variation amount) and computes a total sum $\Delta sum$ of the absolute values of the fluctuation amounts. The reason for using absolute values is to avoid causing the movement waveforms of the aforementioned independent systems to cancel each other out and to better emphasize the movement waveforms.

Step S6 is a movement determining step in which the activation determining section 12 determines if the vehicle is moving or stopped based on the total sum $\Delta sum$ of the absolute values of the fluctuation amounts. The movement determination can also be executed by the aforementioned movement detecting section 13.

More specifically, the activation determining section 12 compares the total sum $\Delta sum$ of the absolute values of the fluctuation amounts to still a different threshold value $\alpha$ (third threshold value) to determine if the vehicle is moving or stopped. The activation determining section 12 determines that the vehicle is moving if the sum total $\Delta sum$ is larger than the threshold value $\alpha$ and that the vehicle is stopped if the sum total is smaller than the threshold value α. The threshold value α is set a value that can be used to reliably identify whether the vehicle is moving or stopped. Since the threshold value α needs to be set more precisely as the number of load detecting sections 8A decreases, the threshold value α is set carefully by trial and error to a value that delivers an appropriate determination result.

If the total sum Δsum is smaller than the threshold value α, then the vehicle is stopped and control proceeds to step S7, which is a vehicle stopped determining step in which the activation determining section 12 determines whether or not to activate the airbag apparatus 3 based on the passenger recognizing signal from the passenger recognizing section 11 and holds the determination result.

Conversely, if the total sum Δsum is larger than the threshold value α, then the vehicle is moving and control proceeds to step S8, which is a vehicle moving determining step in which the activation determining section 12 holds a determination result from a previous cycle without determining whether or not to activate the airbag apparatus 3 based on the passenger recognizing signal from the passenger recognizing section 11.

Finally, step S9 is an output step in which the activation determining section 12 outputs the determination result held in step S7 or step S8 to the airbag controller 4. Control then returns to step S1 again and repeats the loop. If only a seated state recognition is executed during the passenger recognition operation, then the determination as to whether or not to activate the airbag apparatus 3 is based solely on whether or not a passenger is seated or not seated. If both a seated state recognition and a body type recognition are executed during the passenger recognition operation or if only a body type recognition is executed, then the determination as to whether or not to activate the airbag apparatus 3 is based on whether the passenger is an adult or the passenger is a child (or a passenger is not seated). Additionally, in step S9, it is acceptable to include a signal stabilization logic that causes the passenger recognition signal to be outputted to the airbag controller 4 after it has been confirmed that the determination result is stable and has remained the same for a prescribed amount of time.

Effects of the embodiment will now be explained.

(1) With the movement detecting section 13 and other components as explained above, an accurate determination as to whether the vehicle is moving or stopped can be accomplished inside the passenger detection controller 9 and execution of a determination as to whether or not to activate the airbag apparatus 3 based on the passenger recognition signal can be avoided when the vehicle is moving. Thus, with a load detection signal that reflects whether the vehicle is moving (e.g., see the portion of the curve E in FIG. 5 that corresponds to when the vehicle is traveling through a curve), the activation determining section 12 can obtain a correct activation determination even under conditions where the passenger recognizing section 11 might deliver an incorrect passenger recognition result.

(2) The movement waveform removing section 16 as explained above can obtain a movement-waveform-removed signal by removing a movement waveform from the load detection signals obtained by the load detecting sections 8A. Then, using the movement-waveform-removed signal, the passenger recognizing section 11 can execute an accurate passenger recognition operation without being affected by the movement waveform. Meanwhile, the movement detecting section 13 can execute an accurate movement determination using the load detection signals from the load detecting sections 8A, which have not been subjected to movement waveform removal and still include the movement waveforms.

As a result, the passenger detecting controller 9 can obtain an accurate movement detection signal internally and it is not necessary to acquire a movement detection signal or equivalent signal from an external source. Acquiring a movement signal or the like from an external source is disadvantageous because it entails such difficulties as providing an interface with respect to the external source and establishing compatibility with respect to the movement detection signal (or the like) from the external source. Such difficulties can be avoided if the movement detection signal can be obtained inside the passenger detection controller 9. However, if the aforementioned difficulties can be resolved, then it is also possible to configure the system to acquire a movement detection signal or an equivalent signal from an external source.

(3) If the seat 2 is supported on the vehicle body 21 at a plurality of support points 24a to 24d, then load detecting sections 8A are installed with respect to at least one of the support points 24a to 24d and not installed with respect to at least one of the support points 24a to 24d. In this way, the number of load detecting sections 8A, which are expensive, can be reduced to a number smaller than the total number of support points 24a to 24d and the cost of the passenger detection system can be reduced.

When the number of load detecting sections 8A installed is smaller than the total number of support points 24a to 24d of the seat 2, the total sum of the load detection signals is smaller than the load caused by the passenger and easily affected by a traveling state (e.g., if the vehicle is traveling through a rightward curve or a leftward curve). However, as explained previously, since a determination as to whether or not to activate the airbag apparatus 3 based on the passenger recognition signal is not executed while the vehicle is moving, a correct activation determination result can be obtained even if the number of load detecting sections 8A is reduced.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The expression "or the like" indicates that an equivalent thing is included in the meaning. Also as used herein to describe the above embodiment, the following directional terms "forward", "rearward", "above", "downward", "vertical", "horizontal", "below" and "transverse" as well as any other similar directional terms refer to those directions of a vehicle equipped with the passenger detection system. Accordingly, these terms, as utilized to describe the present invention should be interpreted relative to a vehicle equipped with the passenger detection system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. If an embodiment has a plurality of constituent parts, the invention includes workable combinations of the constituent parts of even if there is no particular mention of such combinations in the text. Similarly, if a plurality of embodiments and variations are presented, the invention includes workable combinations of the constituent features of the embodiments and variations. The invention also includes features depicted in the drawings even if the features are not particularly mentioned in the text. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A passenger detection system comprising:
   a passenger detecting part installed peripherally with respect to a seat of a vehicle, the passenger detecting part including a load detecting section configured and arranged to detect a load caused by a passenger seated on the seat; and
   a passenger detection controller including
      a passenger recognizing section configured to execute a passenger recognition based on a load detection signal outputted from the load detecting section,
      a movement detecting section configured to detect whether the vehicle is moving or stopped based on the load detection signal outputted from the load detecting section, and
      an activation determining section configured to execute a determination as to whether or not to activate an airbag apparatus of the vehicle based on a passenger recognition signal outputted from the passenger recognizing section and to issue an activation determination signal when a movement detection signal outputted from the movement detecting section indicates that the vehicle is stopped, and to forgo executing a determination as to whether or not to activate the airbag apparatus and to hold a determination result from a previous control cycle when the movement detection signal indicates that the vehicle is moving.

2. The passenger detection system according to claim 1, wherein
   the passenger detection controller further includes a movement waveform removing section configured to remove a movement waveform, which indicates the vehicle is moving, from the load detection signal outputted from the load detecting section,
   the passenger recognizing section is configured to generate the passenger recognition signal based on a movement-waveform-removed signal resulting after the movement waveform has been removed from the load detection signal outputted from the load detecting section by the movement waveform removing section, and
   the movement detecting section is configured to generate the movement detection signal based on the load detection signal outputted from the load detecting section before the movement waveform is removed by the movement waveform removing section.

3. The passenger detection system according to claim 1, wherein
   the load detection section is not installed in at least one of a plurality of support points at which the seat is supported via a support structure on a vehicle body, and the load detection section is installed in at least one of the rest of the support points.

4. The passenger detection system according to claim 2, wherein
   the load detection section is not installed in at least one of a plurality of support points at which the seat is supported via a support structure on a vehicle body, and the load detection section is installed in at least one of the rest of the support points.

* * * * *